US012223873B2

(12) United States Patent
Lee

(10) Patent No.: US 12,223,873 B2
(45) Date of Patent: Feb. 11, 2025

(54) DISPLAY DEVICE AND IMAGE DISPLAY METHOD THEREOF

(71) Applicant: Samsung Display Co., Ltd., Yongin-Si (KR)

(72) Inventor: Kyung Hun Lee, Yongin-si (KR)

(73) Assignee: Samsung Display Co., Ltd., Yongin -Si (KR)

( * ) Notice: Subject to any disclaimer, the term of this patent is extended or adjusted under 35 U.S.C. 154(b) by 0 days.

(21) Appl. No.: 18/142,616

(22) Filed: May 3, 2023

(65) Prior Publication Data

US 2024/0062693 A1 Feb. 22, 2024

(30) Foreign Application Priority Data

Aug. 16, 2022 (KR) ........................ 10-2022-0102224

(51) Int. Cl.
*G09G 3/20* (2006.01)

(52) U.S. Cl.
CPC ....... *G09G 3/20* (2013.01); *G09G 2310/0286* (2013.01); *G09G 2310/08* (2013.01); *G09G 2320/046* (2013.01)

(58) Field of Classification Search
CPC ............. G09G 3/20; G09G 2310/0286; G09G 2310/08; G09G 2320/046; G09G 3/32; G09G 2320/0257; G09G 2330/026; G09G 3/007; G09G 2330/04; G09G 2310/0275; G09G 2320/043; G09G 2360/16
See application file for complete search history.

(56) References Cited

U.S. PATENT DOCUMENTS

| | | | | |
|---|---|---|---|---|
| 10,043,438 | B2 | 8/2018 | Park | |
| 10,854,123 | B2 | 12/2020 | Kim et al. | |
| 2019/0325849 | A1* | 10/2019 | Lee | G09G 5/393 |
| 2020/0074906 | A1* | 3/2020 | Lee | G09G 3/20 |

FOREIGN PATENT DOCUMENTS

| | | | |
|---|---|---|---|
| KR | 10-2007-0010710 | A | 1/2007 |
| KR | 10-2020-0079867 | A | 7/2020 |
| KR | 10-2320676 | B1 | 11/2021 |
| KR | 10-2333908 | B1 | 12/2021 |
| KR | 10-2448094 | B1 | 9/2022 |

* cited by examiner

*Primary Examiner* — Abhishek Sarma
(74) *Attorney, Agent, or Firm* — Innovation Counsel LLP

(57) ABSTRACT

An image display method of a display device shifts an image along a first path during a first power-on of the display device and shifts the image along a second path different from the first path during a second power-on of the display device.

14 Claims, 16 Drawing Sheets

DISPLAY DEVICE AND IMAGE DISPLAY METHOD THEREOF

This application claims priority to Korean Patent Application No. 10-2022-0102224, filed on, Aug. 16, 2022, and all the benefits accruing therefrom under 35 U.S.C. § 119, the content of which in its entirety is herein incorporated by reference.

BACKGROUND

1. Field

An embodiment of the disclosure relates to a display device and an image display method thereof.

2. Description of the Related Art

When display devices output a specific image or text for a long time, a specific pixel may deteriorate and thus an afterimage may occur.

A technology (so-called pixel shift technology) for displaying an image by moving the image on a display panel at a predetermined period is used. When the image is moved and displayed on the display panel at a predetermined period, the same data is prevented from being output to a specific pixel for a long time, thereby preventing deterioration of the specific pixel.

SUMMARY

A display device may move an image along a specific path by a pixel shift technology.

When the display device is powered on again after being powered off, the display device may display an image from a position of a last screen (for example, from a point at which the image is positioned when the display device is powered off). In this case, the image may be displayed in a shifted state in a specific direction, and a user may recognize that the display device displays the image abnormally.

In addition, when the image is displayed in a center of the display device according to power-on of the display device and then the image is moved along a specific path, only a portion of the specific path may be used according to a driving time of the display device, and thus deterioration of an image in a specific area may be prevented.

An object of the disclosure is to provide a display device and an image display method thereof capable of preventing deterioration of a pixel by moving an image by a pixel shift operation.

Objects of the disclosure are not limited to the object described above, and other technical objects which are not described will be clearly understood by those skilled in the art from the following description.

In order to achieve an object of the disclosure, an image display method of a display device according to embodiments of the disclosure includes shifting an image along a first path during a first power-on of the display device, and shifting the image along a second path different from the first path during a second power-on of the display device.

A second movement direction in which the image is initially shifted along the second path may be different from a first movement direction in which the image is initially shifted along the first path.

A location at which an image is initially displayed when the display device is powered on may be different from a location at which an image is displayed when the display device is powered off.

A location at which an image is initially displayed during the second power-on of the display device may be identical to a location at which an image is initially displayed during the first power-on of the display device.

A display surface of the display device on which the image is displayed may include a plurality of areas, the shifting the image along the first path may include displaying the image at a reference point, and shifting the image from the reference point to a first area among the plurality of areas, and the shifting the image along the second path may include displaying the image at the reference point, and shifting the image from the reference point to a second area among the plurality of areas.

The reference point may be an area center of the display surface.

The shifting the image from the reference point to the first area may include shifting the image along the first movement direction from the reference point to a first outermost point of the first area, and shifting the image along a direction opposite to the first movement direction, and the first outermost point may be a point farthest apart from the reference point among points within the first area.

The shifting the image from the reference point to the second area may include shifting the image along a second movement direction from the reference point to a second outermost point of the second area, and shifting the image along a direction opposite to the second movement direction, and the second outermost point may be a point farthest apart from the reference point among points within the second area.

The image display method may further include shifting the image along a third path different from the first path and the second path during a third power-on of the display device.

The image display method may further include shifting the image along a fourth path different from the first path, the second path, and the third path during a fourth power-on of the display device.

The shifting the image along the first path may include counting a driving time of the display device, and updating information on an initial movement direction or an initial shift path when the driving time exceeds a reference time, and the second path is set based on the updated information.

In order to achieve an object of the disclosure, an image display method of a display device according to embodiments of the disclosure includes resetting a shift path when the display device is powered on, setting a shift path for a current frame image by analyzing an accumulated stress map which indicates a deterioration degree of pixels, and converting first image data of the current frame image with second image data so that the current frame image is shifted along the shift path for the current frame image.

The setting the shift path for the frame image may include grouping the pixels into pixel blocks, calculating an average luminance value of each of the pixel blocks based on image data, and generating the accumulated stress map by accumulating the average luminance value for each pixel block.

The setting the shift path for the frame image may include determining a least deteriorated pixel block based on the accumulated stress map, and setting the shift path so that the current frame image is shifted toward the least deteriorated pixel block.

The setting the shift path for the frame image may include calculating a luminance difference between accumulated average luminance values of the pixel blocks included in the accumulated stress map and setting the shift path based on the luminance difference.

The resetting the shift path may include displaying an image in a screen center in response to reset of the shift path during the display device is powered on.

In order to achieve an object of the disclosure, a display device according to embodiments of the disclosure includes a display panel including pixels, an image converter resetting a shift path whenever the display device is powered on, and convert first data into second data so that an image displayed on the display panel is shifted along the reset shift path, and a data driver configured to provide a data signal corresponding to the second data to the pixels.

The image converter may include a path setting block which receives a power enable signal and sets an initial movement direction of an image in a current power on period to be different from an initial movement direction of an image in a previous power-on period.

The image converter may further include an image correction block which receives first image data and the initial movement direction of the image in the current power on period, and generates second image data.

The image converter may include a memory which stores data for the shift path and provides the shift path to the image correction block.

Details of other embodiments are included in the detailed description and drawings.

The display device and the image display method of the display device according to embodiments of the disclosure may set a path (an initial path, or an initial movement direction) through which the image is shifted differently whenever the display device is powered on. Therefore, a deviation of a driving time between the pixels in the display device may be reduced, and deterioration of an image in a specific area may be prevented.

An effect according to embodiments is not limited by the contents exemplified above, and more various effects are included in the present specification.

BRIEF DESCRIPTION OF THE DRAWINGS

The above and other features of the disclosure will become more apparent by describing in further detail embodiments thereof with reference to the accompanying drawings, in which.

DETAILED DESCRIPTION OF THE EMBODIMENT

Figure 1:
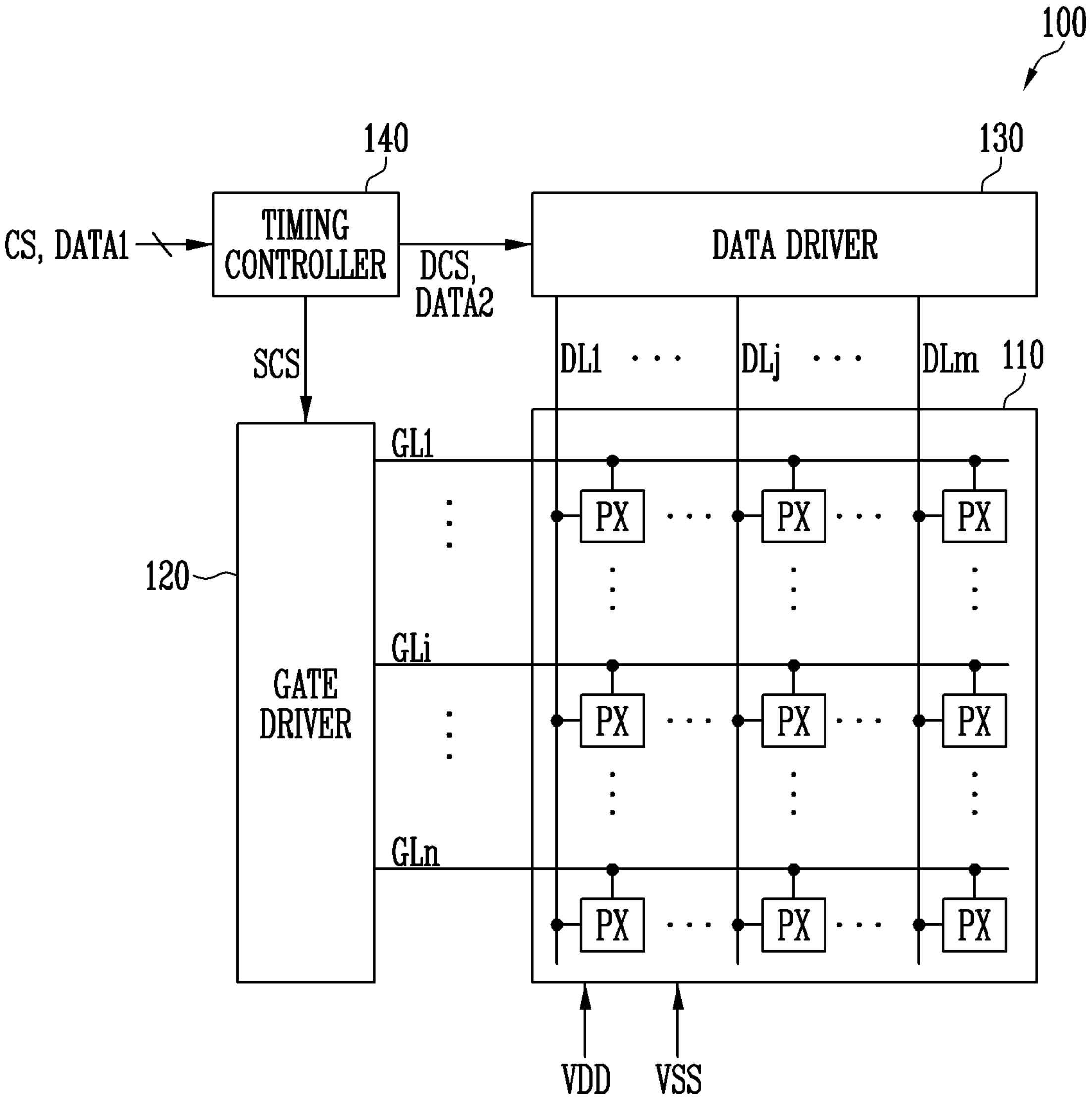
FIG. 1 is a schematic block diagram of a display device according to embodiments of the disclosure.

The disclosure may be modified in various ways and may have various forms, and specific embodiments will be illustrated in the drawings and described in detail herein. In the following description, the singular forms also include the plural forms unless the context clearly includes the singular.

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the inventive concept. In addition, in some embodiments, the block, unit and/or module may be physically combined into more complex blocks, units, and/or modules without departing from the scope of the inventive concept.

A term "connection" between two configurations may mean that both of an electrical connection and a physical connection are used inclusively but is not limited thereto. For example, "connection" used based on a circuit diagram may mean an electrical connection, and "connection" used based on a cross-sectional view and a plan view may mean a physical connection.

Although a first, a second, and the like are used to describe various components, these components are not limited by these terms. These terms are used only to distinguish one component from another component. Therefore, a first component described below may be a second component within the technical spirit of the disclosure. The singular expression includes the plural expression unless the context clearly dictates otherwise.

Meanwhile, the disclosure is not limited to the embodiments disclosed below and may be modified in various forms and may be implemented. In addition, each of the embodiments disclosed below may be implemented alone or in combination with at least one of other embodiments.

In the drawings, some components which are not directly related to a characteristic of the disclosure may be omitted to clearly represent the disclosure. In addition, some components in the drawings may be shown with a slightly exaggerated, size, ratio, or the like. Throughout the drawings, the same or similar components will be given by the same reference numerals and symbols as much as possible even though they are shown in different drawings, and repetitive descriptions will be omitted.

Figure 2:
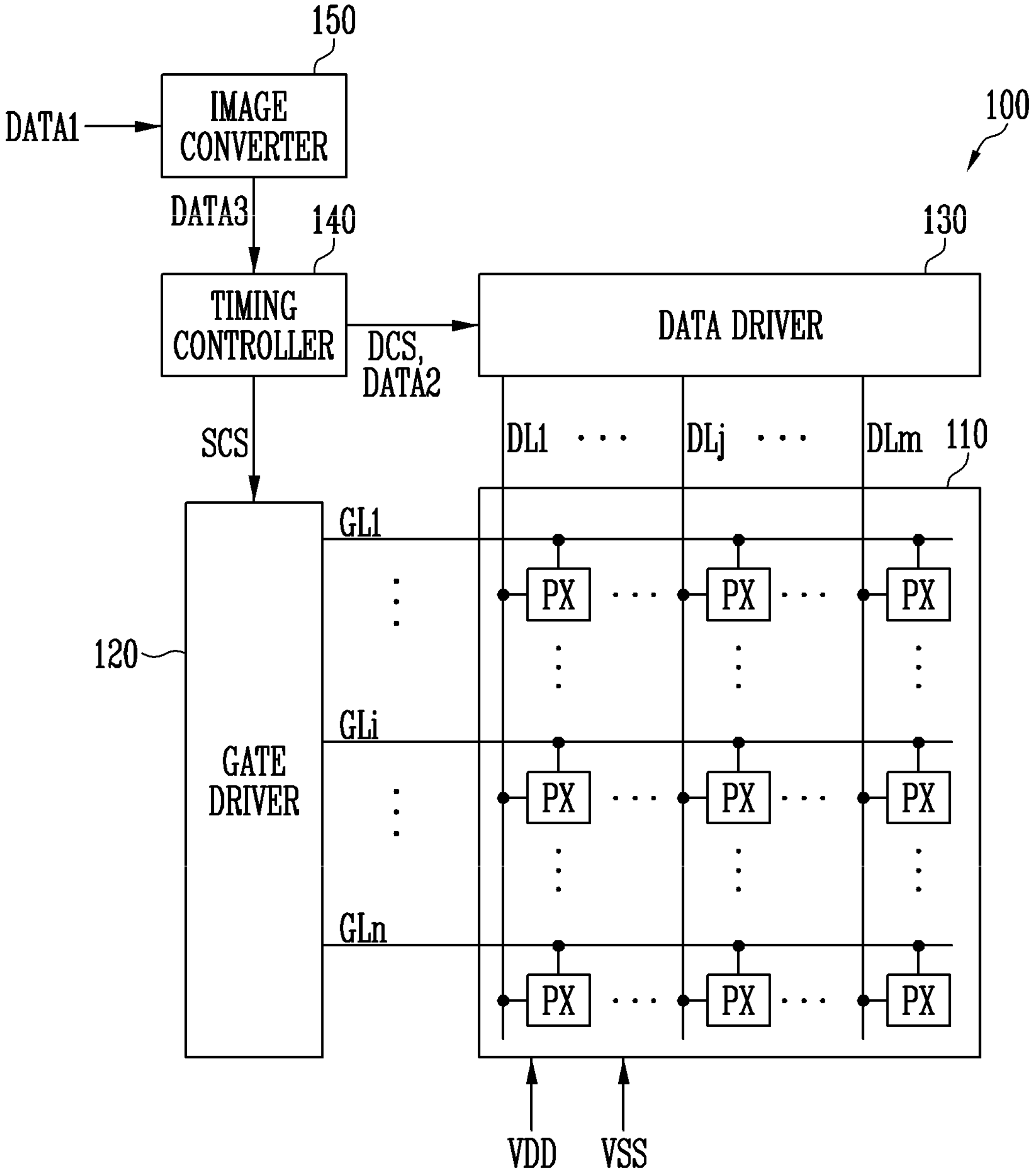
FIGS. 2 and 3 are diagrams illustrating an embodiment of the display device of FIG. 1.
Figure 3:
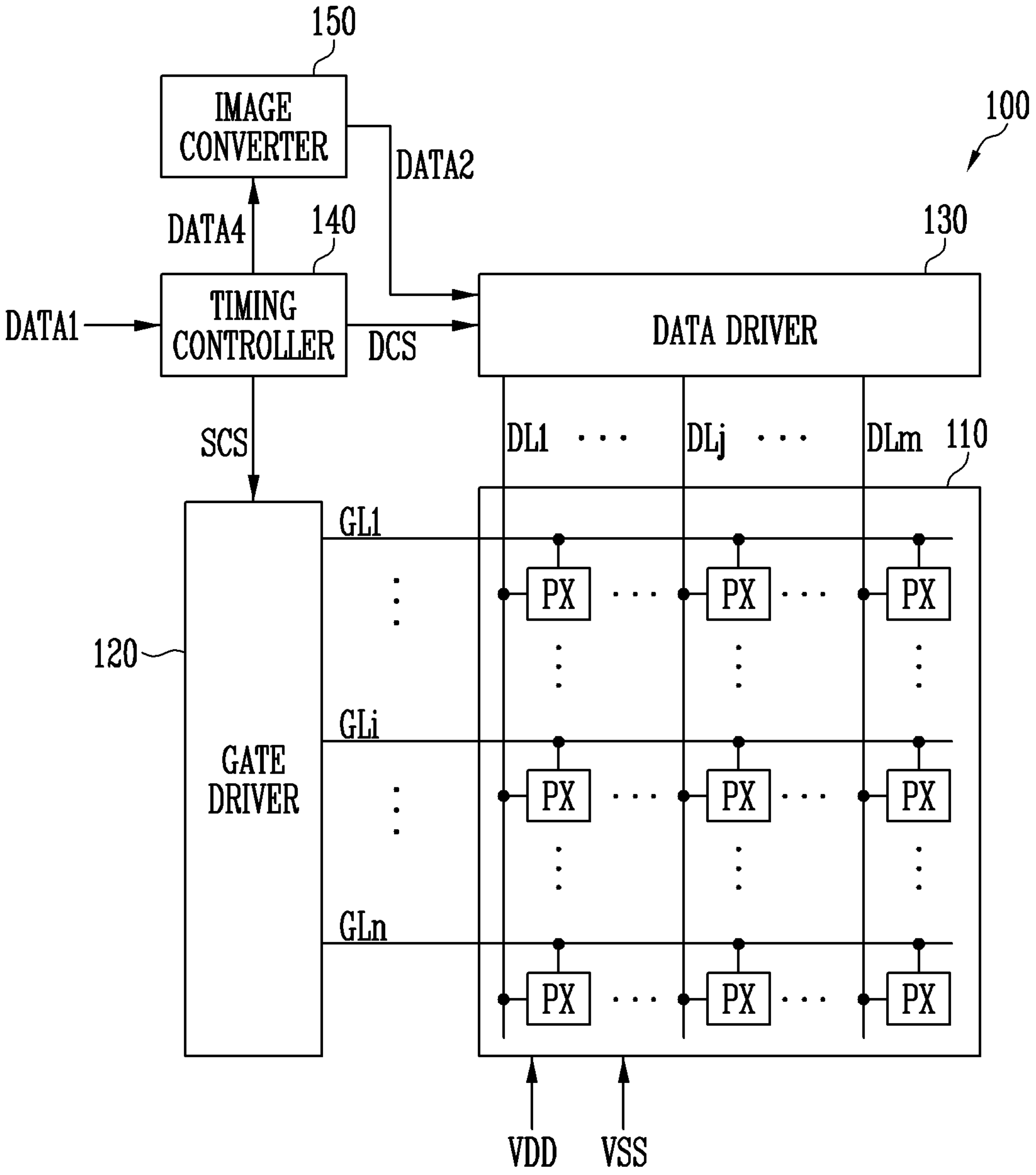

FIG. 1 is a schematic block diagram of a display device according to embodiments of the disclosure. FIGS. 2 and 3 are diagrams illustrating an embodiment of the display device of FIG. 1.

First, referring to FIG. 1, the display device 100 may include a display unit 110 (or a display panel), a gate driver 120 (or a scan driver), a data driver 130 (or a source driver), and a timing controller 140 (or an auxiliary processor).

The display device 100 may be implemented as an inorganic light emitting display device. For example, the display device 100 may include a flexible display device, a rollable display device, a curved display device, a transparent display device, a mirror display device, and the like. For example, the display device 100 may be implemented as a display device including an inorganic light emitting element having a size of a nanoscale to a micro-scale. However, the display device 100 is not limited thereto, and the display device 100 may be implemented as an organic light emitting display device including an organic light emitting element.

The display unit 110 may display an image (or a frame image). The display unit 110 may include gate lines GL1 to GLn (where n is a positive integer (or gate lines), data lines DL1 to DLm (where m is a positive integer), and pixels PX (or sub-pixels). A first power voltage VDD (or a first driving voltage) and a second power voltage VSS (or a second driving voltage) for driving of the pixels PX may be supplied to the display unit 110. According to an embodiment, an initialization voltage or the like for initialization of the pixels PX may be further supplied to the display unit 110.

Each of the pixels PX may be disposed or positioned in an area (for example, a pixel area) defined by the gate lines GL1 to GLn and the data lines DL1 to DLm. For example, the pixels PX may be arranged in an m×n matrix form.

The each of the pixels PX may be connected to one of the gate lines GL1 to GLn and one of the data lines DL1 to DLm. For example, a pixel PX positioned in an i-th row and a j-th column may be connected to an i-th gate line GLi and a j-th data line DLj. The each of the pixel PX may emit light with a luminance corresponding to a data signal (or a data voltage) of the j-th data line DLj in response to a gate signal of the i-th gate line GLi.

The gate driver 120 may generate gate signals (scan signals, or control signals) based on a gate control signal SCS (or a scan control signal) and provide the gate signals to the gate lines GL1 to GLn. Here, the gate control signal SCS may include a start signal, clock signals, and the like, and may be provided from the timing controller 140 to the gate driver 120. For example, the gate driver 120 may be implemented as a shift register that generates and outputs the gate signal by sequentially shifting a pulse shape of start signal using the clock signals.

The gate driver 120 may be formed on the display 110 together with the pixels PX. However, the gate driver 120 is not limited thereto. For example, the gate driver 120 may be implemented as an integrated circuit, mounted on a circuit film, and connected to the timing controller 140 via at least one circuit film and printed circuit board.

The data driver 130 may generate the data signals (or the data voltages) based on second data DATA2 (or image data) and a data control signal DCS provided from the timing controller 140 and provide the data signals to the display unit 110 (or the pixels PX) through the data lines DL1 to DLm. Here, the data control signal DCS may be a signal that controls an operation of the data driver 130 and may include a load signal (or a data enable signal) indicating an output of a valid data signal, a horizontal start signal, a data clock signal, and the like.

For example, the data driver 130 may include a shift registers generating sampling signals by shifting the horizontal start signal in synchronization with a data clock signal, latches latching the second data DATA2 in response to the sampling signal, digital-to-analog converters (or a decoder) converting latched image data (for example, digital data) into analog data signals, and a buffer (or an amplifier) outputting the data signals to the data lines DL1 to DLm.

The timing controller 140 receives first data DATA1 (or input image data) and a control signal CS from an external device (for example, an application processor or a graphic processor), generate the gate control signal SCS and the data control signal DCS based on the control signal CS, and generate the second data DATA2 by converting the first data DATA1. The control signal CS may include a vertical synchronization signal, a horizontal synchronization signal, a reference clock signal, and the like. For example, the timing controller 140 may convert the first data DATA1 into the second data DATA2 having a format matching a pixel arrangement in the display unit 110 (that is, a format conversion operation). As another example, the timing controller 140 may generate the second data DATA2 by compensating for the first data DATA1 using a deterioration compensation technique for compensating for deterioration of the pixels PX (that is, a deterioration compensation operation). In addition, the timing controller 140 may generate the second data DATA2 by compensating for the first data DATA1 using various compensation techniques in addition to the deterioration compensation technique.

In embodiments, the timing controller 140 may control the display unit 110 (the gate driver 120, and the data driver 130) so that the image is shifted along a shift path (or a movement path). That is, the timing controller 140 may use a pixel shift technique. For example, the timing controller 140 may generate the second data DATA2 by converting the first data DATA1 so that the image is shifted along the shift path.

In an embodiment, the timing controller 140 may set or update (or reset) the shift path whenever the display device 100 is powered on. For example, the timing controller 140 may select a different shift path (for example, a shift path different from a shift path selected during a previous power-on) whenever the display device 100 is powered on. A configuration for shifting the image along the shift path is described later with reference to FIG. 7.

Meanwhile, although it has been described that the timing controller 140 shifts the image, the disclosure is not limited thereto.

Referring to FIGS. 2 and 3, the display device 100 may further include an image converter 150 (or an image conversion circuit) for shifting the image.

The image converter 150 may reset the shift path whenever the display device 100 is powered on and generate the third data DATA3 by converting the first data DATA1 so that the image displayed on the display 110 is shifted along the reset shift path.

The image converter 150 may be implemented as a processor or an integrated circuit independent of the timing controller 140 or may be implemented as one functional block of the timing controller 140.

In an embodiment, as shown in FIG. 2, the image converter 150 may be disposed at a front end of the timing controller 140 and generate third data DATA3 by converting the first data DATA1 so that the image is shifted along the shift path. In this case, the timing controller 140 may convert the third data DATA3 into the second data DATA2 having a format matching the pixel arrangement in the display unit 110 or generate the second data DATA2 by performing a deterioration compensation operation or the like on the third data DATA3.

For example, the image converter 150 of FIG. 2 may be implemented as an application processor (AP), a mobile AP, a central processing unit (CPU), a graphic processing unit (GPU), or a processor capable of controlling an operation of the display device 100 but is not limited thereto.

In another embodiment, as shown in FIG. 3, the image converter 150 may be disposed at a rear end of the timing controller 140 and generate the second data DATA2 by converting fourth data DATA4 received from the timing controller 140 so that the image is shifted along the shift path. Here, the fourth data DATA4 may be generated through a format conversion operation, a compensation operation (for example, a deterioration compensation operation), or the like of the first data DATA1 in the timing controller 140.

For example, the image converter 150 of FIG. 3 may be implemented as one functional block of the timing controller 140 but is not limited thereto. According to an embodiment, the image converter 150 and the data driver 130 of FIG. 3 may be implemented as one integrated circuit.

Meanwhile, in FIGS. 1 to 3, the data driver 130 and the timing controller 140 may be implemented as separate integrated circuits, respectively, but embodiments are not limited thereto. For example, the data driver 130 and the timing controller 140 may be implemented as one integrated circuit. According to an embodiment, at least two of the gate driver 120, the data driver 130, and the timing controller 140 may be implemented as one integrated circuit.

Figure 4:
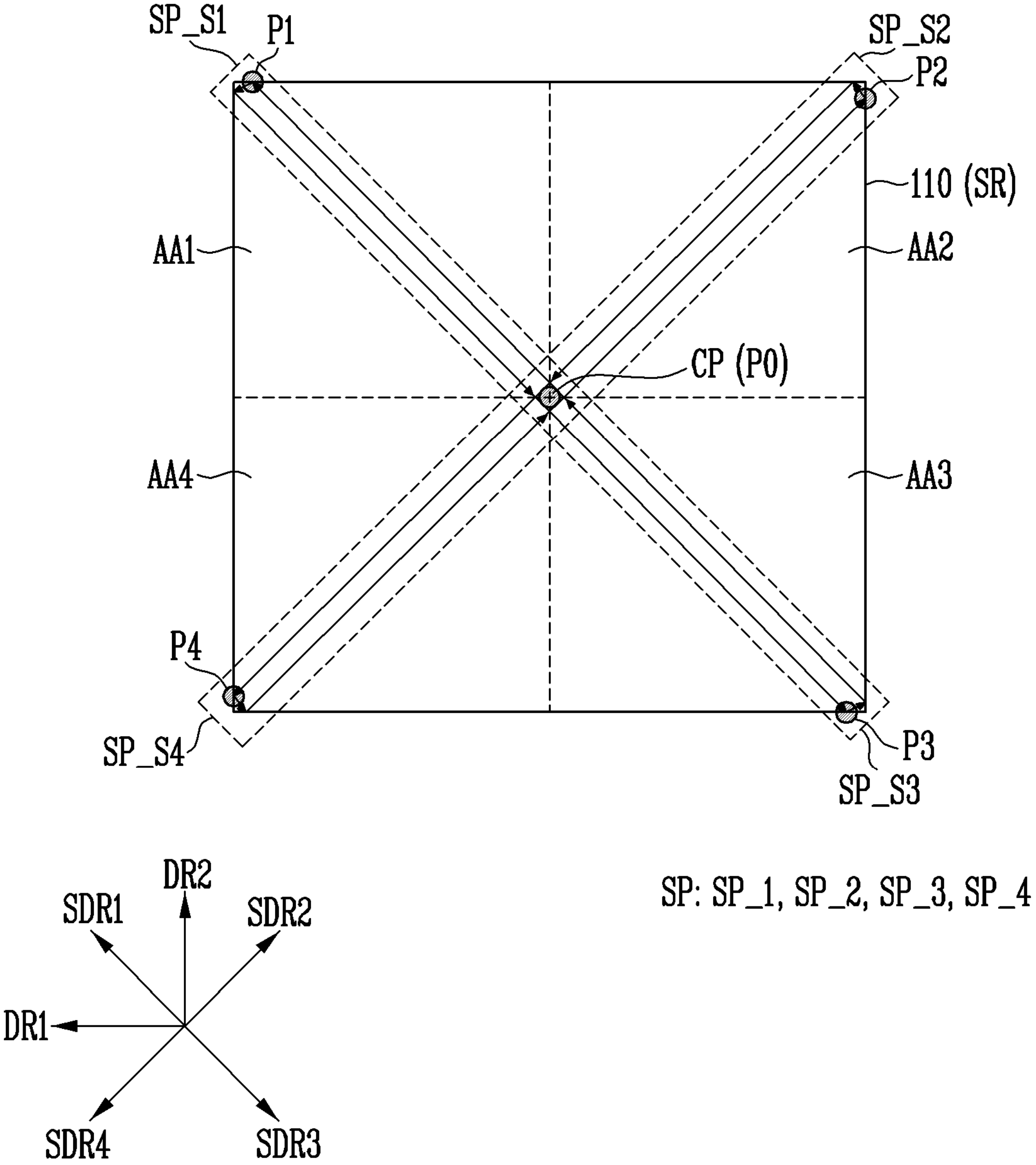
FIG. 4 is a diagram illustrating an embodiment of a shift path used in the display device of FIG. 1.
Figure 5:
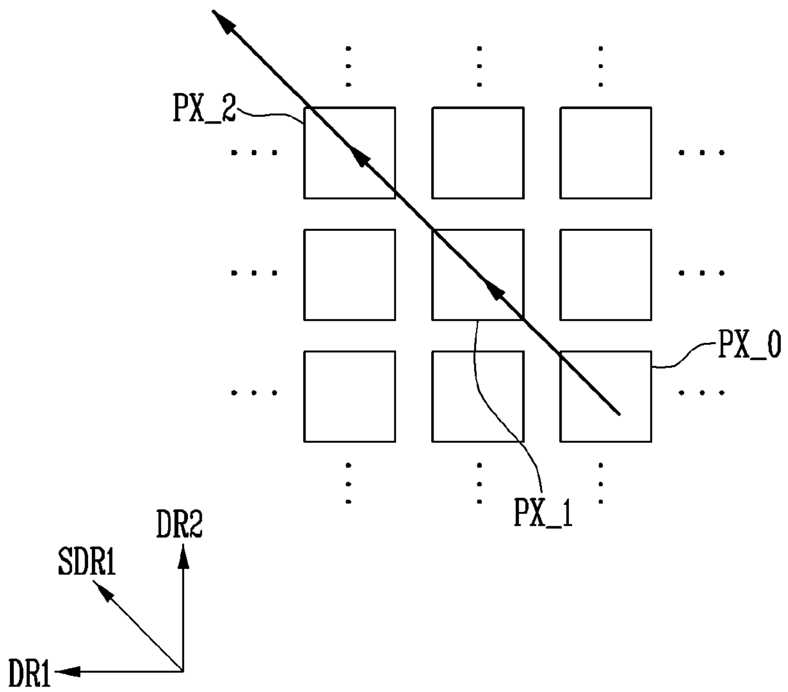
FIGS. 5 and 6 are diagrams illustrating an embodiment of a first path of FIG. 4.
Figure 6:
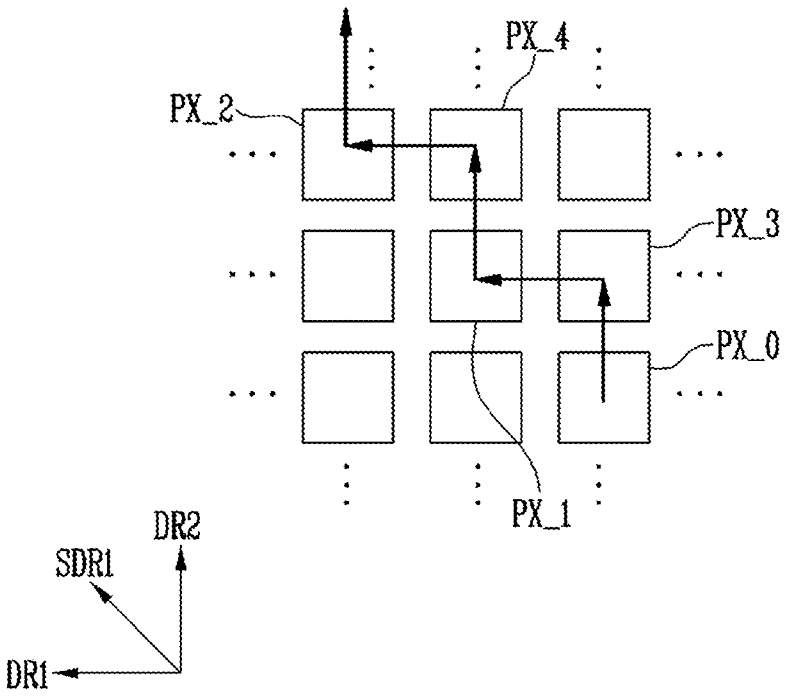
Figure 7:
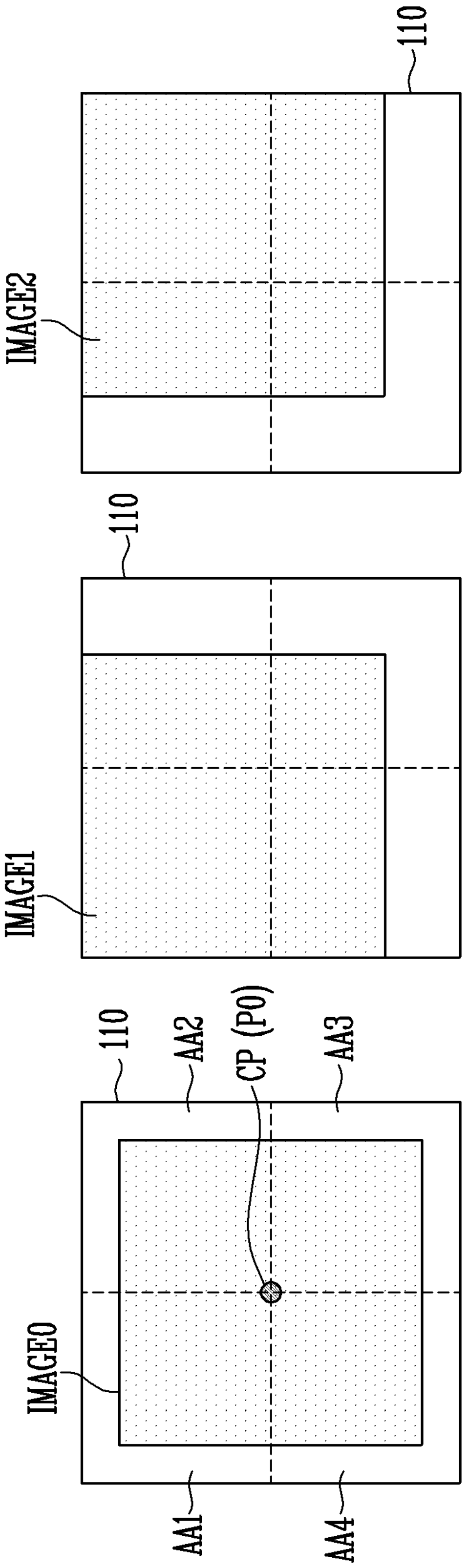
FIG. 7 is a diagram illustrating an image shifted along the shift path of FIG. 5.

FIG. 4 is a diagram illustrating an embodiment of the shift path used in the display device of FIG. 1. FIGS. 5 and 6 are diagrams illustrating an embodiment of a first path of FIG. 4. FIG. 7 is a diagram illustrating an image shifted along the shift path of FIG. 5. FIG. 7 shows an image displayed on a display area of the display unit 110.

Referring to FIGS. 1 to 4, the display unit 110 (a shift range SR in which an image may be shifted, or a shift allowable range) may include a plurality of areas AA1 to AA4. For example, reference lines may extend in a first direction DR1 and a second direction DR2 and pass through an area center CP (or a screen center) of the display unit 110 (or the display area of the display unit 110), and the display unit 110 may include a first area AA1, a second area AA2, a third area AA3, and a fourth area AA4 which are defined by the reference lines. However, the disclosure is not limited thereto, and the display unit 110 may include five or more areas. For convenience of description, it is assumed that the display unit 110 includes four areas AA1 to AA4.

A shift path SP (or an entire shift path) may include a plurality of paths SP_S1 to SP_S4 respectively disposed in the plurality of areas AA1 to AA4. For example, the shift path SP may include a first path SP_S1 disposed in the first area AA1, a second path SP_S2 disposed in the second area AA2, and a third path SP_S3 disposed in the third area AA3, and a fourth path SP_S4 disposed in the fourth area AA4.

The first path SP_S1 may be a substantially reciprocating path from a reference point P0 corresponding to the area center CP of the display unit 110 to a first point P1 disposed in an upper left corner of the display unit 110. Here, the first point P1 (or a first outermost point) may be a point farthest from the reference point P0 among points where the pixels are disposed and the image may be displayed within the first area AA1, but the location of the first point P1 is not limited thereto. When the image is shifted along the first path SP_S1, the image may generally move from the reference point P0 to the first point P1 in a first movement direction SDR1, and then may generally move from the first point P1 to the reference point P0 in a third movement direction SDR3. A path from the reference point P0 to the first point P1 and a path from the first point P1 to the reference point P0 may completely coincide with each other or may be somewhat deviated from each other.

For example, as shown in FIG. 5, the image (or a center of the image) may be sequentially disposed in pixels PX_0, PX_1, and PX_2 arranged along the first movement direction SDR1. A time in which the image is disposed in each of the pixels PX_0, PX_1, and PX_2 may depend on a specification of the display device 100, and, for example, the time may be 1 minute, 3 minutes, or the like. As another example, as shown in FIG. 6, the image (or the center of the image) may be sequentially shifted via pixels PX_0, PX_3, PX_1, PX_4 and PX_2. In other words, the image may alternately move in the second direction DR2 and the first direction DR1 and may also move in the first movement direction SDR1 as a whole.

Meanwhile, although it has been described that the image is shifted in one pixel unit in FIGS. 5 and 6, the disclosure is not limited thereto. For example, the image may be shifted in a unit of two or more pixels.

Similarly, the second path SP_S2 may be a substantially reciprocating path from the reference point P0 to a second point P2 disposed in an upper right corner of the display unit 110. Here, the second point P2 (or a second outermost point) may be a point farthest from the reference point P0 among points within the second area AA2, but the location of the second point P2 is not limited thereto. When the image is shifted along the second path SP_S2, the image may move from the reference point P0 to the second point P2 in the second movement direction SDR2, and then may move from the second point P2 to the reference point P0 in a fourth movement direction SDR4.

Similarly, the third path SP_S3 may be a substantially reciprocating path from the reference point P0 to a third point P3 disposed in a lower right corner of the display unit 110. Here, the third point P3 (or a third outermost point) may be a point farthest from the reference point P0 among points within the third area AA3, but the location of the third point P3 is not limited thereto. When the image is shifted along the third path SP_S3, the image may move from the reference point P0 to the third point P3 in the third movement direction SDR3, and then may move from the third point P3 to the reference point P0 in the first movement direction SDR1.

Similarly, the fourth path SP_S4 may be a substantially reciprocating path from the reference point P0 to a fourth point P4 disposed in a lower left corner of the display unit 110. Here, the fourth point P4 (or a fourth outermost point) may be a point farthest from the reference point P0 among points within the fourth area AA4, but the location of the fourth point P4 is not limited thereto. When the image is shifted along the fourth path SP_S4, the image may move from the reference point P0 to the fourth point P4 in the fourth movement direction SDR4, and then may move from the fourth point P4 to the reference point P0 in the second movement direction SDR2.

When the shift path SP has a plurality of points such as an "X" shape, the image may be alternately shifted to a central area and a peripheral area of the display unit 110 as compared to a shift path of a spiral shape or a zigzag shape, Therefore, a deviation of a driving time between the central area and the peripheral area (or between the pixels) of the display unit 110 may be reduced, and thus deterioration of an image in a specific area may be prevented.

According to an embodiment, the shift path SP may sequentially include the first path SP_S1, the second path SP_S2, the third path SP_S3, and the fourth path SP_S4, but the shift path SP is not limited thereto.

The timing controller 140 of FIG. 1 (or the image converter 150 of FIGS. 2 and 3) may select one of the first path SP_S1, the second path SP_S2, the third path SP_S3, and the fourth path SP_S4 when the display device 100 is powered on. For example, the timing controller 140 may shift the image along the shift path SP and may select or update the path (the initial path, or the initial movement direction) through which the image is to be initially shifted whenever the display device 100 is powered on.

Referring to FIGS. 4 and 7, an initial image IMAGED indicates a case in which a center of the image is positioned at the reference point P0. A black image may be displayed on a remaining area of the display unit 110 (or the display area of the display unit 110) on which an image (or a valid image) is not displayed, but the disclosure is not limited thereto.

A first image IMAGE1 indicates a case in which the center of the image is disposed at an upper-left quadrant, for example, a case in which an upper left end point of the image is displayed on an upper left end point of the display unit 110. A second image IMAGE2 indicates a case in which the center of the image is disposed at an upper-right quadrant, for example, a case in which an upper right end point of the image is displayed on an upper right end point of the display unit 110.

For reference, when the image is displayed and shifted from a previous point where the image was displayed when the display device 100 was powered off, the user may recognize that the display device 100 displays the image abnormally. Since the user generally focuses on the center of the display unit 110 while the display device 100 is continuously driven, the user may not recognize a bias (or shift) of the image such as the first image IMAGE1. However, when the display device 100 is initially driven, for example, when the display device is powered-on, since the user does not focus on the center of the display unit 110, the bias of the image may be recognized by the user. Therefore, when the display device 100 is powered on, the center of the image may be displayed on the reference point P0 and shifted therefrom.

Meanwhile, when the display device 100 is repeatedly powered-on and powered-off (or driven) during a relatively short time, deterioration may not be effectively prevented from occurring. For example, this is because when the display device 100 is repeatedly powered-on and powered-off during a time less than a time required for the image to be shifted from an initial point to an end point of the first path SP_S1, the image is repeatedly displayed only within the first path SP_S1 and is not shifted to a remaining path (that is, the second path SP_S2 and the like), and a deviation of a driving time occurs between the areas AA1 to AA4.

Therefore, the display device 100 (the timing controller 140, or the image converter 150) may determine or set the initial path (that is, the path or the movement direction in which the image is to be shifted initially when the display device 100 is powered-on) differently whenever the display device 100 is powered-on.

Figure 8:
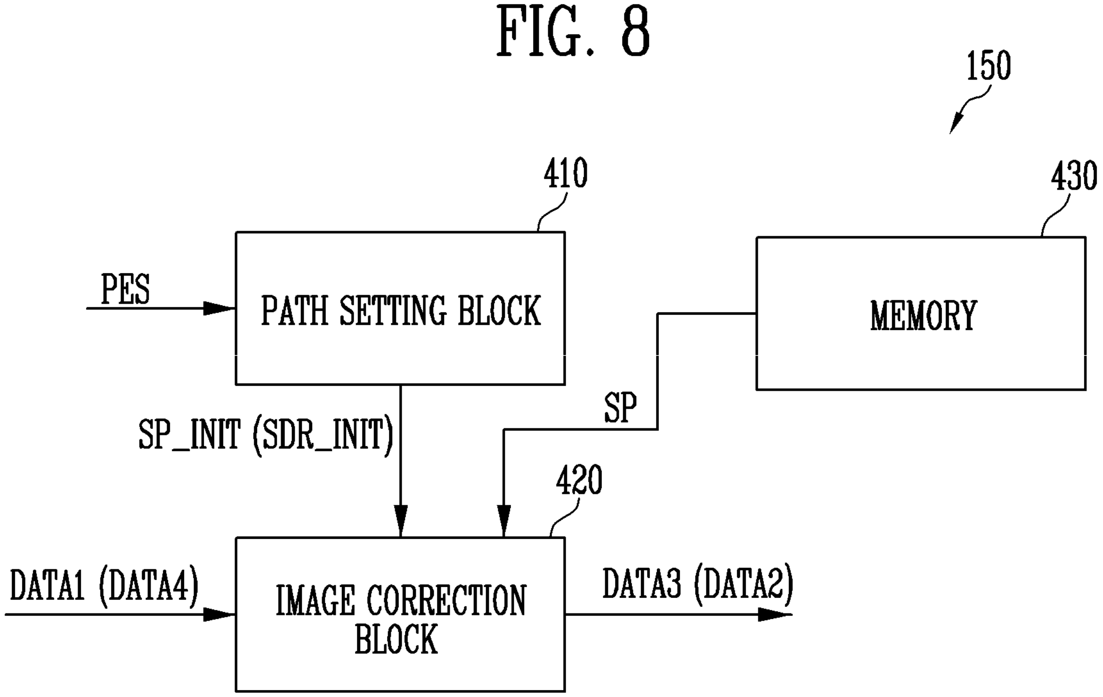
FIG. 8 is a block diagram schematically illustrating an embodiment of an image converter of FIGS. 2 and 3.
Figure 9:
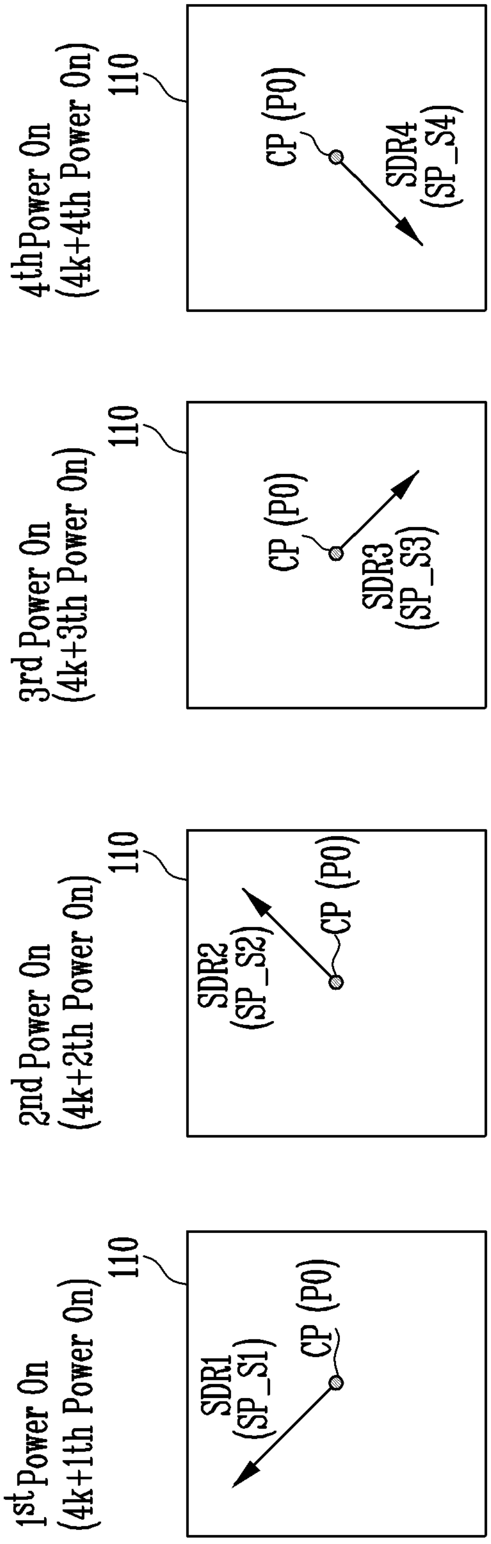
FIG. 9 is a diagram illustrating an embodiment of an operation of the image converter of FIG. 8.
Figure 10:
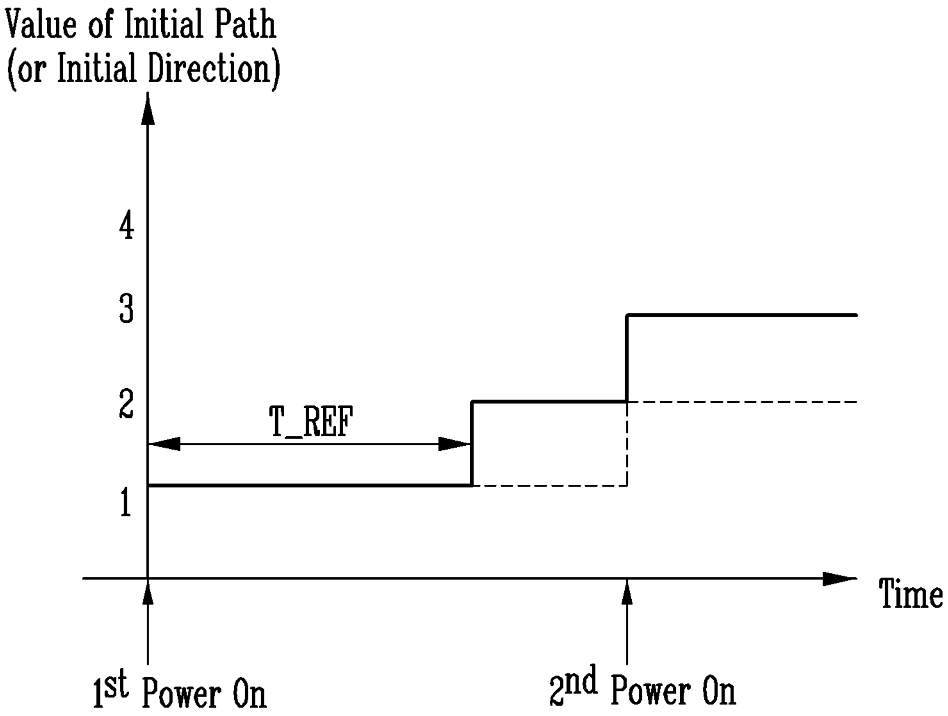
FIG. 10 is a diagram illustrating another embodiment of the operation of the image converter of FIG. 8.

FIG. 8 is a block diagram schematically illustrating an embodiment of the image converter of FIGS. 2 and 3. FIG. 9 is a diagram illustrating an embodiment of an operation of the image converter of FIG. 8. FIG. 10 is a diagram illustrating another embodiment of the operation of the image converter of FIG. 8. FIG. 10 shows a change of information on the initial path according to a driving time.

Referring to FIGS. 1 to 8, the image converter 150 (or the timing controller 140) may include a path setting block 410 and an image correction block 420. In addition, the image converter 150 may further include a memory 430 (or a memory device).

The path setting block 410 may update (or reset) the shift path SP based on a power enable signal PES. Here, the power enable signal PES may indicate power-on of the display device 100. For example, when the display device 100 is powered on, the power enable signal PES may be provided from a power supply (for example, a power management integrated circuit (PMIC)) of the display device 100. However, the disclosure is not limited thereto, and the power enable signal PES may be a power voltage itself required for driving of the image converter 150 or a signal obtained by sensing the power voltage. That is, various signals capable of indicating the power-on of the display device 100 may be used as the power enable signal PES, and the power enable signal PES is not particularly limited.

In addition, the path setting block 410 may change an application order of the paths SP_S1 to SP_S4 in the shift path SP whenever the display device 100 is powered on.

In an embodiment, the path setting block 410 may update an initial path SP_INIT (that is, the path or the movement direction in which the image is initially shifted when the display device 100 is powered on) based on the power enable signal PES.

Referring to FIG. 9, for example, when the display device 100 is powered on for the first time, the path setting block 410 may set an initial movement direction SDR_INIT to a first movement direction SDR1 or set the initial path SP_INIT to the first path SP_S1. For example, when the display device 100 is powered on for the first time, the path setting block 410 may update information on the initial movement direction SDR_INIT or the initial path SP_INIT to a value of 1. When the display device 100 is powered on for the second time, the path setting block 410 may set the initial movement direction SDR_INIT to a second movement direction SDR2 or set the initial path SP_INIT to the second path SP_S2. For example, when the display device 100 is powered on for the second time, the path setting block 410 may update the information on the initial movement direction SDR_INIT or the initial path SP_INIT to a value of 2. When the display device 100 is powered on for the third time, the path setting block 410 may set the initial movement direction SDR_INIT to a third movement direction SDR3 or set the initial path SP_INIT to the third path SP_S3, and update the information on the initial movement direction SDR_INIT or the initial path SP_INIT to a value of 3. When the display device 100 is powered on for the fourth time, the path setting block 410 may set the initial movement direction SDR_INIT to a fourth movement direction SDR4 or set the initial path SP_INIT to the fourth path SP_S4, and update the information on the initial movement direction SDR_INIT or the initial path SP_INIT to a value of 4. In such a method, when the display device 100 is powered on (4k+1)-th, (4k+2)-th, (4k+3)-th, and (4k+4)-th, the path setting block 410 may set the initial movement direction SDR_INIT to the first movement direction SDR1, the second movement direction SDR2, the third movement direction SDR3, and the fourth movement direction SDR4, respectively. Here, k may be a positive integer.

Meanwhile, the order shown in FIG. 9 (that is, the application order of the paths SP_S1 to SP_S4) is exemplary and is not limited thereto. For example, the fourth path SP_S4, the third path SP_S3, the second path SP_S2, and the first path SP_S1 may be sequentially applied whenever the display device 100 is powered on. According to an embodiment, the application order of the paths SP_S1 to SP_S4 may be random. For example, any one of remaining paths (for example, the second, third, and fourth paths SP_S2, SP_S3, and SP_S4) except for a path (for example, the first path SP_S1) selected in a previous driving period of the display device 100 may be selected as a current driving period of the display device 100.

In an embodiment, the path setting block 410 may update the initial movement direction SDR_INIT or the initial path SP_INIT (or information thereon) based on a driving time of the display device 100.

Referring to FIG. 10, for example, when the display device 100 is powered on for the first time, the path setting block 410 may update the information on the initial movement direction SDR_INIT or the initial path SP_INIT to a value of 1.

After the display device 100 is powered on for the first time, when the driving time of the display device 100 exceeds a reference time T_REF, the path setting block 410 may update the information on the initial movement direction SDR_INIT or the initial path SP_INIT to a value of 2. For example, the path setting block 410 may count or measure the driving time of the display device 100 using a counter. For example, the reference time T_REF may be about a half of a time required for one cycle of the image shifts along the entire shift path SP, but the reference time T_REF is not limited thereto. For example, when the display device 100 is driven more than the reference time T_REF after the display device 100 is powered on for the first time, the image may complete shift along the first path SP_S1 and the third path SP_S3, and may be shifting along the second path SP_S2 among the shift paths SP of FIG. 4. In a state in which the information on the initial movement direction SDR_INIT or the initial path SP_INIT is not updated (for example, a dotted line of FIG. 10), when the display device 100 is powered on for the second time, the information may be updated to a value of 2, and the image may be shifted again along the second path SP_S2. Therefore, when the driving time of the display device 100 exceeds the reference time T_REF, the information on the initial movement direction SDR_INIT or the initial path SP_INIT may be updated to a value of 2 (or another value) even while the display device 100 is driven so that the image is not shifted again along the second path SP_S2. In this case, when the display device 100 is powered on for the second time, the information may be updated to a value of 3 and the image may be shifted along the initial path other than the second path SP_S2.

The image correction block 420 may convert the first data DATA1 (or the fourth data DATA4 of FIG. 3) into the third data DATA3 (or the second data DATA2 of FIG. 3) based on the initial movement direction SDR_INIT or the initial path SP_INIT (or the information thereon).

For example, when the second path SP_S2 is set as the initial path SP_INIT, the image correction block 420 may receive a value of 2 as the information on the initial path SP_INIT, and may convert the first data DATA1 into the third data DATA3 so that the image is shifted in an order of the second path SP_S2, the fourth path SP_S4, the first path SP_S1, and the third path SP_S3. As another example, when the third path SP_S3 is set as the initial path SP_INIT, the image correction block 420 may receive a value of 3 as the information on the initial path SP_INIT, and may convert the first data DATA1 into the third data DATA3 so that the image is shifted in an order of the third path SP_S3, the second path SP_S2, the fourth path SP_S4, and the first path SP_S1.

The memory 430 may store data for the shift path SP and may provide the data for the shift path SP to the image correction block 420. The shift path SP may include the first path SP_S1, the second path SP_S2, the third path SP_S3, and the fourth path SP_S4. Each of the first path SP_S1, the second path SP_S2, the third path SP_S3, and the fourth path SP_S4 may include information about the location of the image, or information on a shifting direction and/or a shifting order of the image.

Meanwhile, although it has been described that the data for the shift path SP is provided from the memory 430 to the image correction block 420, the disclosure is not limited thereto. For example, the data for the shift path SP may be provided from the memory 430 to the image correction block 420 through the path setting block 410. As another example, the memory 430 may be omitted or included in the path setting block 410, and the data for the shift path SP may be provided from the path setting block 410 to the image correction block 420.

As described above, the image converter 150 (or the timing controller 140) may determine or set the initial movement direction SDR_INIT or the initial path SP_INIT differently whenever the display device 100 is powered on. Therefore, a deviation of a driving time between the areas AA1 to AA4 (or the pixels) of the display unit 110 may be reduced, and deterioration of the performance of the display unit 110 may be prevented.

Figure 11:
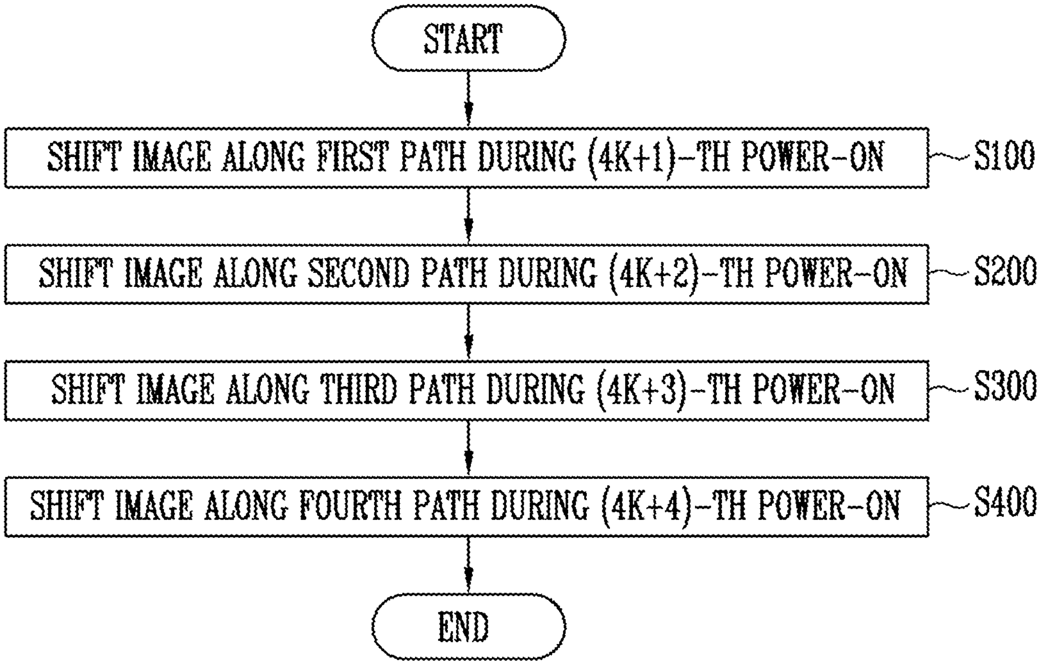
FIG. 11 is a flowchart illustrating an image display method of a display device according to embodiments of the disclosure.
Figure 12:
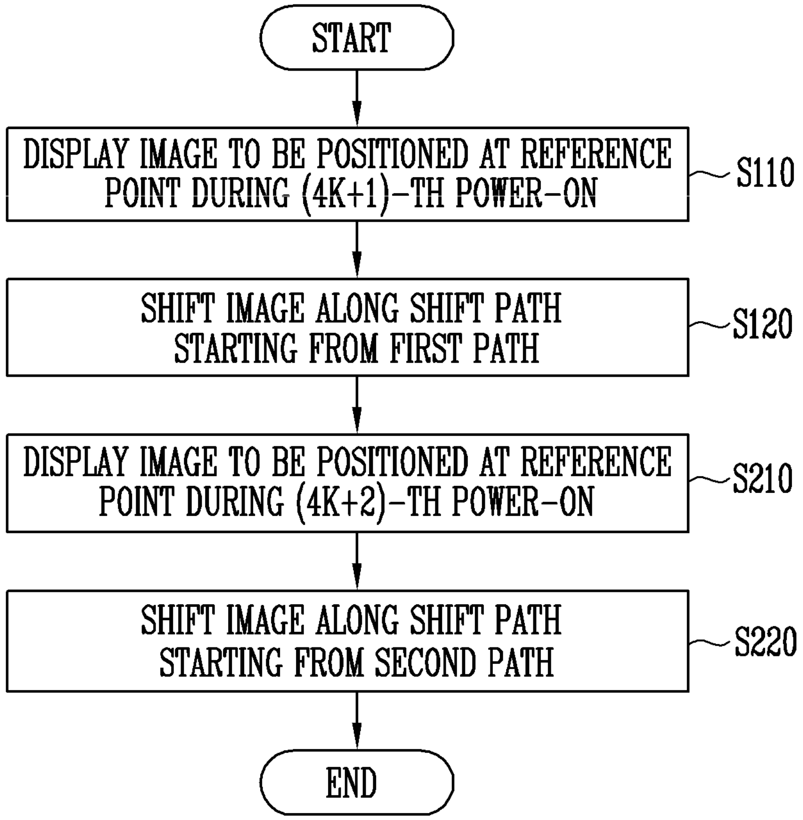
FIG. 12 is a flowchart illustrating an embodiment of the image display method of the display device of FIG. 11.

FIG. 11 is a flowchart illustrating an image display method of a display device according to embodiments of the disclosure. FIG. 12 is a flowchart illustrating an embodiment of the image display method of the display device of FIG. 11.

Referring to FIGS. 1 to 11, the method of FIG. 11 may be performed in the display device 100 of FIG. 1.

The method of FIG. 11 may update or change a path (or information on the path) whenever the display device 100 is powered on and may shift the image according to the updated/changed path.

In embodiments, when the display device 100 is powered on for the (4k+1)-th time, the method of FIG. 11 may shift the image along the first path (or the first movement direction) (S100). When the display device 100 is powered on for the (4k+2)-th time, the method of FIG. 11 may shift the image along the second path (or the second movement direction) different from the first path (S200). When the display device 100 is powered on for the (4k+3)-th time, the method of FIG. 11 may shift the image along the third path (or the third movement direction) different from the first and second paths (S300). When the display device 100 is powered on for the (4k+4)-th time, the method of FIG. 11 may shift the image along the fourth path (or the fourth movement direction) (S400).

As described with reference to FIGS. 4, 8, and 9, when the display device 100 is powered on for the (4k+1)-th time, the method of FIG. 11 may set (update, or reset) the initial path SP_INIT (or the initial movement direction SDR_INIT) to the first path SP_S1 (or the first movement direction SDR1), and shift the image along the shift path SP starting from the first path SP_S1. In addition, when the display device 100 is powered on for the (4k+2)-th time, the method of FIG. 11 may set the initial path SP_INIT (or the initial movement direction SDR_INIT) to the second path SP_S2 (or the second movement direction SDR2), and shift the image along the shift path SP starting from the second path SP_S2. When the display device 100 is powered on for the (4k+3)-th time, the method of FIG. 11 may set the initial path SP_INIT (or the initial movement direction SDR_INIT) to the third path SP_S3 (or the third movement direction SDR3), and shift the image along the shift path SP starting from the third path SP_S3. When the display device 100 is powered on for the (4k+4)-th time, the method of FIG. 11 may set the initial path SP_INIT (or the initial movement direction SDR_INIT) to the fourth path SP_S4 (or the fourth movement direction SDR4), and shift the image along the shift path SP starting from the fourth path SP_S4.

Referring to FIGS. 4, 8, 9, and 12, when the display device 100 is powered on for the (4k+1)-th time, the method of FIG. 12 may display the image so that the image is positioned at the reference point P0 of the display unit 110 (S110), and shift the image along the shift path SP starting from the first path SP_S1 over time (S120). Here, the reference point P0 may correspond to the area center CP of the display unit 110. For example, the method of FIG. 12 may display the image in the screen center in response to the reset of the shift path SP during the power-on of the display device 100.

Thereafter, when the display device 100 is powered on for the (4k+2)-th time, the method of FIG. 12 may display the image so that the image is positioned at the reference point P0 of the display unit 110 (S210), and shift the image along the shift path SP starting from the second path SP_S2 (S220).

That is, whenever the display device 100 is powered on, the method of FIG. 12 may display the image so that the image is positioned at the reference point P0 of the display unit 110 (S110 and S210), and then shift the image along the shift path SP starting a path different from an initial path in a previous driving period (or a previous power-on period) (S120 and S220).

As described above, the image display method of the display device may update or change the path (or the information on the path) differently from a previous path whenever the display device 100 is powered on. Therefore, a deviation of a driving time between the areas AA1 to AA4 (or the pixels) of the display unit 110 may be reduced, and deterioration of the performance of the display unit 110 may be improved.

Figure 13:
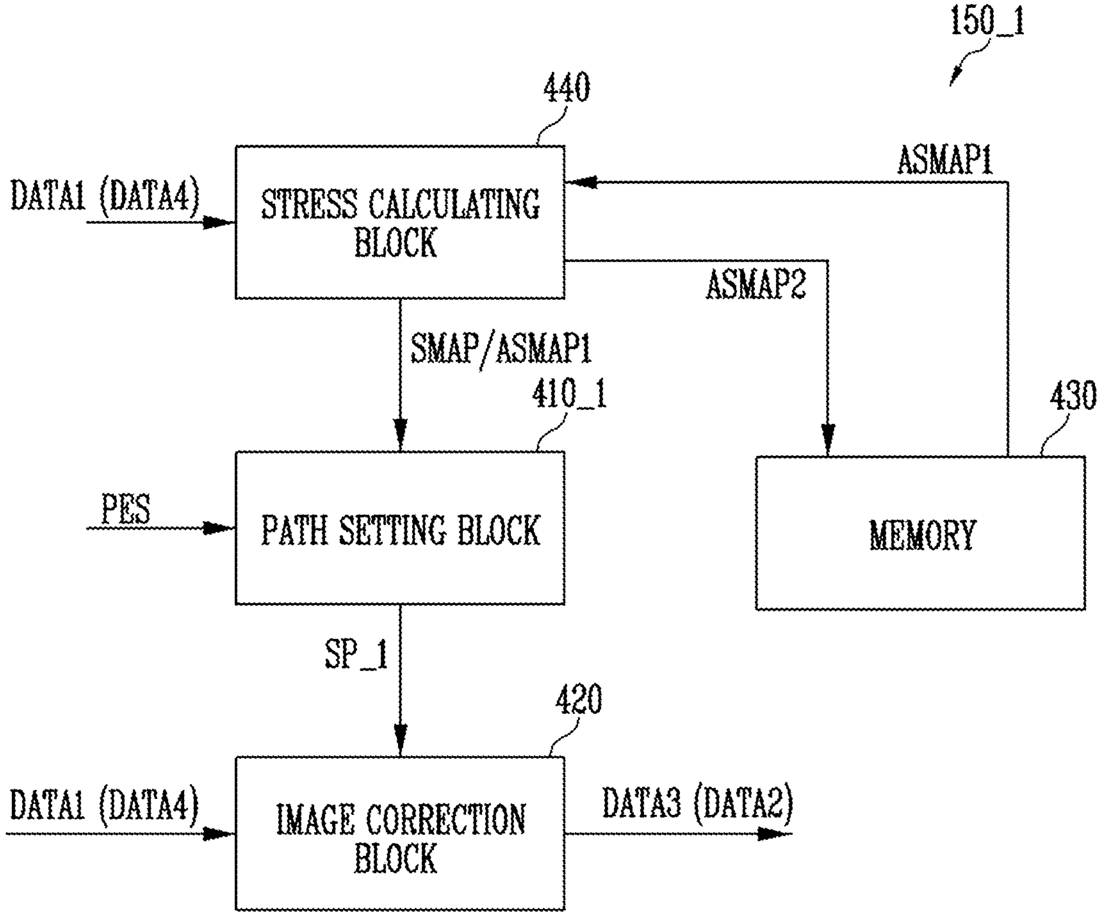
FIG. 13 is a block diagram schematically illustrating another embodiment of the image converter of FIGS. 2 and 3.
Figure 14:
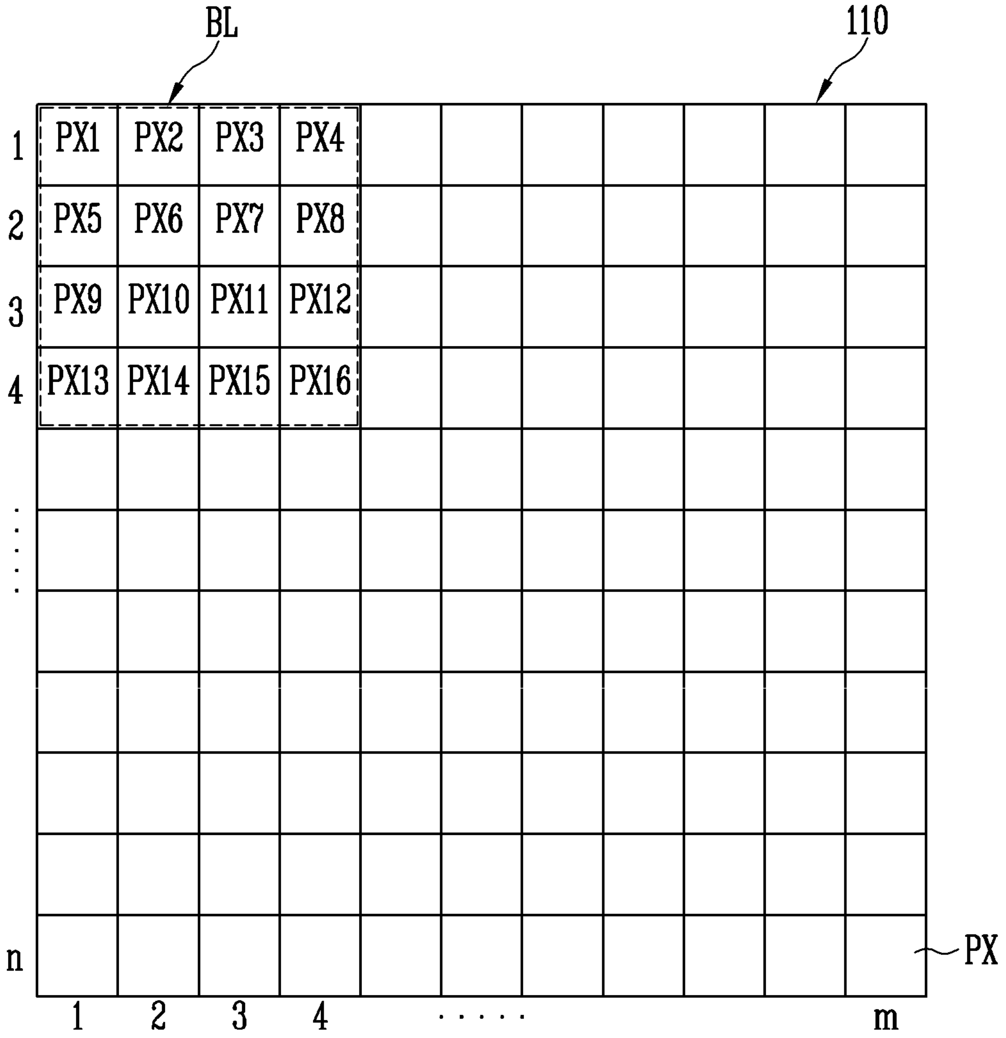
FIG. 14 is a diagram schematically illustrating pixels included in a display unit of FIG. 1.
Figure 15:
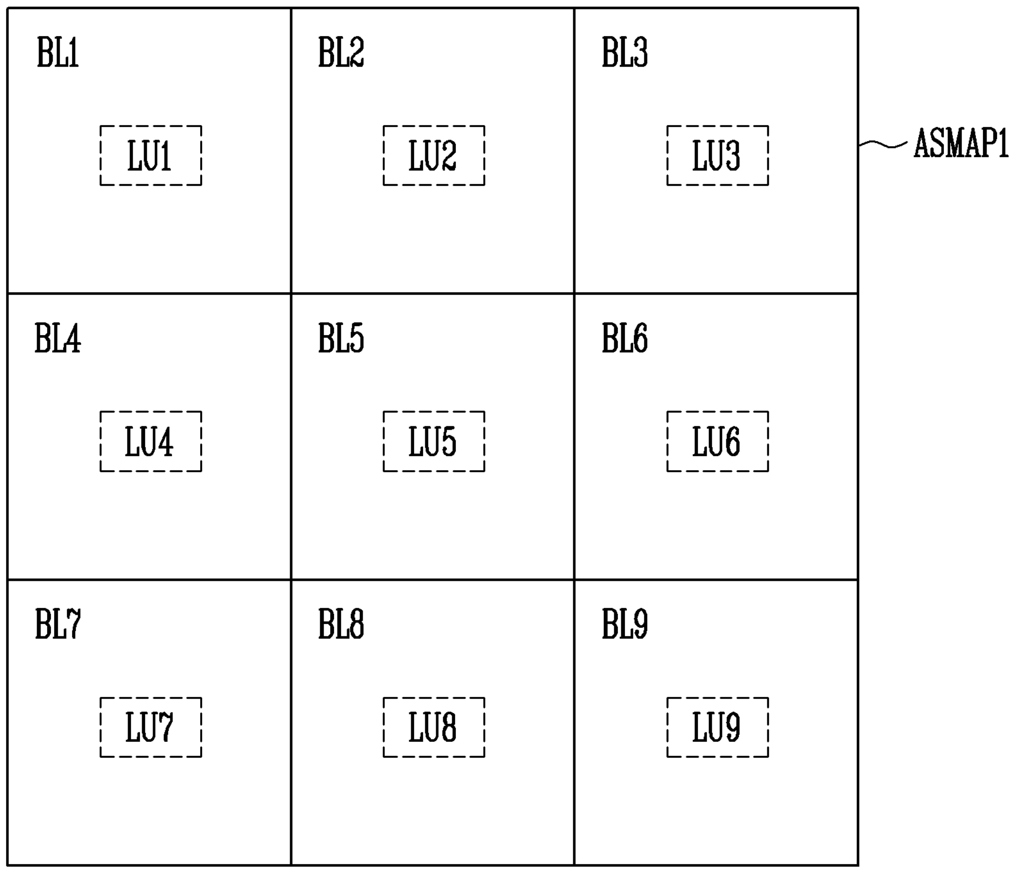
FIG. 15 is a diagram illustrating an embodiment of a first accumulated stress map used in the image converter of FIG. 13.
Figure 16:
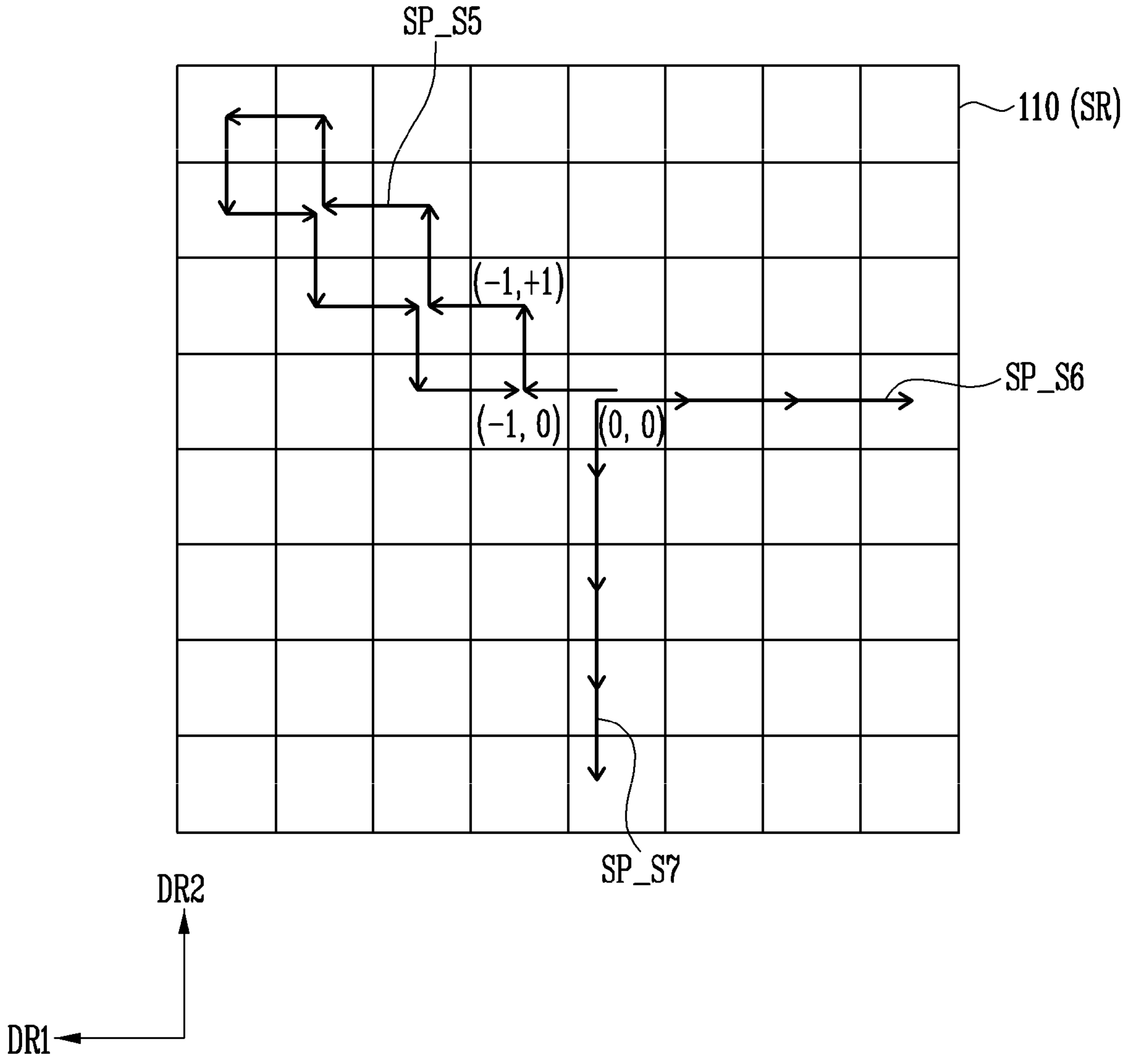
FIG. 16 is a diagram illustrating an embodiment of a shift path set by the image converter of FIG. 13.

FIG. 13 is a block diagram schematically illustrating another embodiment of the image converter of FIGS. 2 and 3. FIG. 14 is a diagram schematically illustrating the pixels included in the display unit of FIG. 1. FIG. 15 is a diagram illustrating an embodiment of a first accumulated stress map used in the image converter of FIG. 13. FIG. 16 is a diagram illustrating an embodiment of a shift path set by the image converter of FIG. 13.

First, referring to FIGS. 1 to 3 and 13, the image converter 150_1 (or the timing controller 140) may set a shift path SP_1 based on a deterioration amount of the pixels PX of the display unit 110, and shift the image according to a shift path SP_1. For example, the image converter 150_1 may set the shift path SP_1 so that the image is shifted to an area including a pixel of which a deterioration amount is small (that is, a pixel that is not deteriorated).

The image converter 150_1 may include a path setting block 410_1, an image correction block 420, and a stress calculation block 440. In addition, the image converter 150_1 may further include a memory 430. Since the image correction block 420 and the memory 430 of FIG. 13 are substantially identical or similar to the image correction block 420 and the memory 430 of FIG. 8, respectively, an overlapping description is not repeated.

The stress calculation block 440 may analyze a luminance distribution of a current frame image (or an image of a current frame) based on the first data DATA1 (or the fourth data DATA4) to generate a stress map SMAP.

In an embodiment, the stress calculation block 440 may generate the stress map SMAP of the current frame image by grouping the pixels PX included in the display unit 110 into pixel blocks and calculating an average luminance value (or an average grayscale value) of each of the pixel blocks. Here, the stress map SMAP may mean an index indicating a degree of deterioration of the pixels included in the pixel blocks displaying the current frame image. The pixel block may include at least one pixel PX.

Referring to FIG. 14, for example, the stress calculation block 440 may group 4×4 pixels PX1 to PX16 into one pixel block BL, and also group remaining pixels PX into pixel blocks BL including 4×4 pixels. For example, the stress calculation block 440 may calculate the average luminance value of the current frame image by averaging luminance values of the pixels PX included in each of the pixel blocks BL, and generate the stress map SMAP of the current frame image including the average luminance value of each pixel block BL. That is, the stress map SMAP may mean a set of luminance values to be emitted by each of the pixel blocks BL to display the current frame image.

In addition, the stress calculation block 440 may generate a second accumulated stress map ASMAP2 based on the stress map SMAP and a first accumulated stress map ASMAP1. The first accumulated stress map ASMAP1 may be provided from the memory 430. The second accumulated stress map ASMAP2 may indicate the degree of the deterioration of the pixels included in the pixel blocks displaying the current frame image as an accumulated index and may be generated by applying (or accumulating) the stress map SMAP of the current frame image to the first accumulated stress map ASMAP1 for previous frame images.

Referring to FIG. 14, for example, the stress calculation block 440 may calculate the average luminance value of each of the pixel blocks BL for each frame image and accumulate the average luminance value calculated for each frame image to calculate the accumulated average luminance value for each of the pixel blocks BL. That is, the first accumulated stress map ASMAP1 may mean a set of accumulated average luminance values emitted by each of the pixel blocks BL from an initial frame image to the previous frame image. Referring to FIG. 15, for example, the first accumulated stress map ASMAP1 may include accumulated average luminance values LU1 to LU9 of pixel blocks BL1 to BL9.

For example, the stress calculation block 440 may generate the second accumulated stress map ASMAP2 by applying the average luminance value of the current frame image to the accumulated average luminance value of the first accumulated stress map ASMAP1. In other words, the stress calculation block 440 may generate the second accumulated stress map ASMAP2 by calculating the accumulated average luminance values emitted by each of the pixel blocks BL from the display of initial frame image to the display of the current frame image.

According to an embodiment, the stress calculation block 440 may supply the stress map SMAP to the path setting block 410_1.

The path setting block 410_1 may reset or initialize the shift path SP_1 based on the power enable signal PES. In this case, when the display device 100 is powered on, the image may be displayed so as to be positioned at the reference point P0 of the display unit 110 of FIG. 4 (for example, the area center of the display unit 110).

The path setting block 410_1 may set the shift path SP_1 by analyzing the first accumulated stress map ASMAP1.

In an embodiment, the path setting block 410_1 may determine the least deteriorated pixel block based on the first accumulated stress map ASMAP1 and set the shift path SP_1 so that the current frame image is shifted toward the least deteriorated pixel block. That is, the path setting block 410_1 may set the shift path SP_1 based on an absolute value of the deterioration amount of the pixel block (or the pixel).

Referring to FIGS. 15 and 16, for example, when the accumulated average luminance value LU1 of the first pixel block BL1 disposed in an upper left corner of the display unit 110 is the smallest (that is, when the first pixel block BL1 is not deteriorated the most), the path setting block 410_1 may set the shift path SP_1 so that the frame image (or the image) is shifted toward the upper left corner of the display unit 110. For example, the path setting block 410_1 may set a fifth path SP S5 of FIG. 16 as the shift path SP_1. In this case, the frame image (or the image) may be shifted toward the upper left corner of the display unit 110 along an arrow direction of the fifth path SP S5. For example, when the display device 100 is powered on, the frame image may be displayed so that a center portion of the frame image is positioned at coordinates (0,0). After a specific time elapses, the frame image may be shifted in the first direction DR1 so that the center portion of the frame image is positioned at coordinates (−1,0). After a specific time elapses again, the frame image may be shifted in the second direction DR2 so that the center portion of the frame image is positioned at coordinates (−1,+1). In such a method, the frame image may be shifted along the fifth path SP S5.

According to an embodiment, when the shift of the image along the set shift path SP_1 (for example, the fifth path SP S5) is ended, the path setting block 410_1 may reset the shift path SP_1 based on the first accumulated stress map ASMAP1 at a corresponding time point.

In an embodiment, the path setting block 410_1 may set the shift path SP_1 based on the first accumulated stress map ASMAP1 and the stress map SMAP. For example, when the current frame image is a still image, the path setting block 410_1 may set the shift path SP_1 based on the first accumulated stress map ASMAP1 and the stress map SMAP. For example, the path setting block 410_1 may determine the least deteriorated first pixel block based on the first accumulated stress map ASMAP1, determine a second pixel block of which the average luminance value of the current frame image is the highest based on the stress map SAMP, and set the shift path SP_1 so that the current frame image is shifted from the second pixel block toward the least deteriorated first pixel block.

Referring to FIGS. 15 and 16, for example, when the accumulated average luminance value LU3 of the third pixel block BL3 is the smallest and the average luminance value of the first pixel block BL1 (that is, the average luminance value of the current frame image) is the largest, the path setting block 410_1 may be set the shift path SP_1 so that the frame image (or image) is shifted in a right direction from the first pixel block BL1 toward the third pixel block BL3. For example, the path setting block 410_1 may set a sixth path SP S6 of FIG. 16 as the shift path SP_1. In this case, the frame image (or the image) may be sequentially shifted toward the right along an arrow direction of the sixth path SP S6.

In another embodiment, the path setting block 410_1 may calculate a luminance difference between the accumulated average luminance values of the pixel blocks included in the first accumulated stress map ASMAP1 and set the shift path SP_1 based on the luminance difference. That is, the path setting block 410_1 may set the shift path SP_1 based on a relative value of the deterioration amount of the pixel blocks (or the pixels).

As a luminance difference between accumulated average luminance values of a specific pixel block and adjacent pixel blocks increases, a degree of deterioration of pixels of the specific pixel block may increase. Therefore, the path setting block 410_1 may set the shift path SP_1 so that the current frame image is shifted from the specific pixel block toward the adjacent pixel block.

Referring to FIGS. 15 and 16, for example, the path setting block 410_1 may calculate a luminance difference between the pixel blocks BL1 to BL9. For example, the path setting block 410_1 may calculate a twelfth luminance difference between the first pixel block BL1 and the second pixel block BL2 by comparing the accumulated average luminance value LU1 of the first pixel block BL1 with the accumulated average luminance value LU2 of the second pixel block BL2. Similarly, the path setting block 410_1 may calculate a fourteenth luminance difference between the first pixel block BL1 and the fourth pixel block BL4 by comparing the accumulated average luminance value LU1 of the first pixel block BL1 with the accumulated average luminance value LU4 of the fourth pixel block BL4. In such a method, luminance differences between the remaining pixel blocks BL2 to BL9 may also be calculated. For example, when the fourteenth luminance difference between the first pixel block BL1 and the fourth pixel block BL4 is greatest, in particular, when the first pixel block BL1 is deteriorated compared to the fourth pixel block BL4, the path setting block 410_1 may set the shift path SP_1 so that the frame image (or image) is shifted in a downward direction from the first pixel block BL1 to the fourth pixel block BL4. For example, the path setting block 410_1 may set a seventh path SP_S7 of FIG. 16 as the shift path SP_1. In this case, the frame image (or the image) may be sequentially shifted downward along an arrow direction of the seventh path SP_S7.

The image correction block 420 may convert the first data DATA1 (or the fourth data DATA4 of FIG. 3) into the third data DATA3 (or the second data DATA2 of FIG. 3) so that the current frame image is shifted along the shift path SP_1.

The memory 430 may store the accumulated stress map ASMAP2. For example, the memory 430 may provide the first accumulated stress map ASMAP1 for the previous frame images to the path setting block 410_1 directly or through the stress calculating block 440, and store the second accumulated stress map ASMAP2 provided directly from the path setting block 410_1 or via the stress calculating block 440, or update the first accumulated stress map ASMPA1 based on the second accumulated stress map ASMAP2.

As described above, the image converter 150_1 (or the timing controller 140 of FIG. 1) may set the shift path SP_1 so that the image is shifted to an area including a pixel which is not deteriorated. Therefore, deterioration of the performance of the display unit 110 may be prevented.

Figure 17:
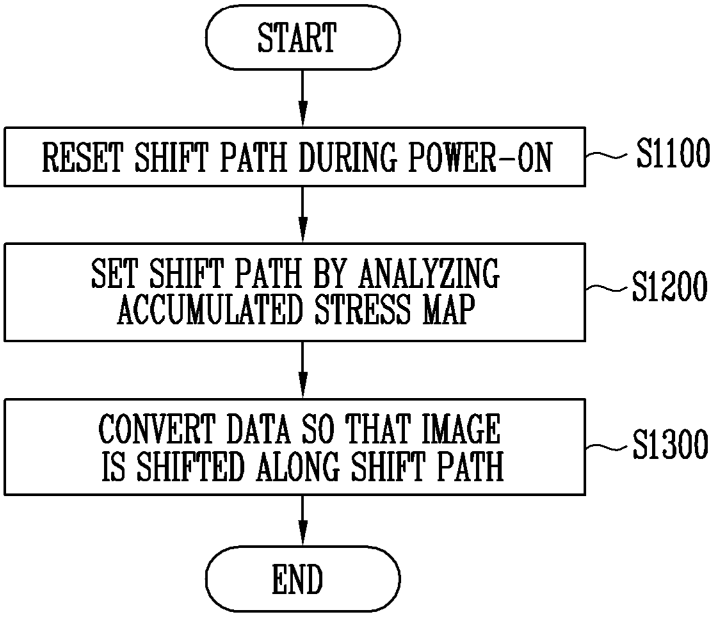
FIG. 17 is a flowchart illustrating an image display method of a display device according to another embodiment of the disclosure.

FIG. 17 is a flowchart illustrating an image display method of a display device according to another embodiment of the disclosure.

Referring to FIGS. 1 to 3 and 13 to 17, the method of FIG. 17 may be performed in the display device 100 of FIG. 1.

The method of FIG. 17 may reset or initialize the shift path SP_1 when the display device 100 is powered on (S1100). In this case, when the display device 100 is powered on, the image may be displayed to be positioned at the reference point P0 of the display unit 110 of FIG. 4.

The method of FIG. 17 may set the shift path SP_1 by analyzing the first accumulated stress map ASMAP1 (S1200). For example, the method of FIG. 17 may set the shift path SP_1 so that the image is shifted to an area including a pixel of which a deterioration amount is small (that is, a pixel which is not deteriorated).

In an embodiment, the method of FIG. 17 may generate the first accumulated stress map ASMAP1 by accumulating the first data DATA1 (or image data). The first accumulated stress map ASMAP1 may indicate the degree of the deterioration of the pixels.

As described with reference to FIGS. 13 to 15, the method of FIG. 17 may generate first accumulated stress map ASMAP1 by grouping the pixels of the display unit 110 into the pixel blocks BL, calculating the average luminance value of each of the pixel blocks BL based on the first data DATA1, and accumulating the average luminance value for each pixel block BL.

In an embodiment, the method of FIG. 17 may determine the least deteriorated pixel block based on the first accumulated stress map ASMAP1 and set the shift path SP_1 so that the current frame image is shifted toward the least deteriorated pixel block.

In another embodiment, the method of FIG. 17 may calculate the luminance difference between the accumulated average luminance values of the pixel blocks included in the first accumulated stress map ASMAP1, and set the shift path SP_1 based on the luminance difference.

Thereafter, the method of FIG. 17 may convert the first data DATA1 (or the fourth data DATA4 of FIG. 3) into the third data DATA3 (or the second data DATA2 of FIG. 3) so that the current frame image is shifted along the shift path SP_1 (S1300).

Although the technical spirit of the disclosure has been described in detail in accordance with the above-described embodiments, it should be noted that the above-described embodiments are for the purpose of description and not of limitation. In addition, those skilled in the art may understand that various modifications are possible within the scope of the technical spirit of the disclosure.

The scope of the disclosure is not limited to the details described in the detailed description of the specification but should be defined by the claims. In addition, it is to be construed that all changes or modifications derived from the meaning and scope of the claims and equivalent concepts thereof are included in the scope of the disclosure.

What is claimed is:

1. An image display method of a display device, comprising:

shifting an image along a first path during a first power-on of the display device; and shifting the image along a second path different from the first path during a second power-on of the display device, wherein a display surface of the display device on which the image is displayed includes a plurality of areas, wherein the shifting the image along the first path comprises:

displaying the image at a reference point; and shifting the image from the reference point to a first area among the plurality of areas, wherein the shifting the image from the reference point to the first area comprises:

shifting the image along a first movement direction from the reference point to a first outermost point of the first area, and shifting the image along a direction opposite to the first movement direction, and wherein the first outermost point is a point farthest apart from the reference point among points within the first area.

2. The image display method according to claim 1, wherein a second movement direction in which the image is initially shifted along the second path is different from the first movement direction in which the image is initially shifted along the first path.

3. The image display method according to claim 2, wherein a location at which an image is initially displayed when the display device is powered on is different from a location at which an image is displayed when the display device is powered off.

4. The image display method according to claim 2, wherein a location at which an image is initially displayed during the second power-on of the display device is identical to a location at which an image is initially displayed during the first power-on of the display device.

5. The image display method according to claim 1, wherein the shifting the image along the second path comprises:

displaying the image at the reference point; and shifting the image from the reference point to a second area among the plurality of areas.

6. The image display method according to claim 1, wherein the reference point is an area center of the display surface.

7. The image display method according to claim 1, wherein the shifting the image from the reference point to the second area comprises:

shifting the image along a second movement direction from the reference point to a second outermost point of the second area; and shifting the image along a direction opposite to the second movement direction, and wherein the second outermost point is a point farthest apart from the reference point among points within the second area.

8. The image display method according to claim 1, further comprising:

shifting the image along a third path different from the first path and the second path during a third power-on of the display device.

9. The image display method according to claim 8, further comprising:

shifting the image along a fourth path different from the first path, the second path, and the third path during a fourth power-on of the display device.

10. The image display method according to claim 1, wherein the shifting the image along the first path comprises:

counting a driving time of the display device; and updating information on an initial movement direction or an initial shift path when the driving time exceeds a reference time, and wherein the second path is set based on the updated information.

11. A display device comprising:

a display panel including pixels;

an image converter resetting a shift path whenever the display device is powered on, and convert first data into second data so that an image displayed on the display panel is shifted along the reset shift path; and a data driver configured to provide a data signal corresponding to the second data to the pixels, wherein a display surface of the display device on which the image is displayed includes a first area, and wherein the reset shift path in the first area starts from a reference point to a first outmost point disposed farthest apart from the reference point among points within the first area and returns from the first outmost point to the reference point.

12. The display device according to claim 11, wherein the image converter comprises a path setting block which receives a power enable signal and sets an initial movement direction of an image in a current power on period to be different from an initial movement direction of an image in a previous power-on period.

13. The display device according to claim 12, the image converter further comprises an image correction block which receives first image data and the initial movement direction of the image in the current power on period and generates second image data.

14. The display device according to claim 13, the image converter further comprises a memory which stores data for the shift path and provides the shift path to the image correction block.

* * * * *